3,364,043
BASIC REFRACTORIES
Ben Davies, Pittsburgh, Pa., assignor to Harbison-Walker Refractories Company, Pittsburgh, Pa., a corporation of Pennsylvania
No Drawing. Filed Oct. 24, 1965, Ser. No. 505,045
4 Claims. (Cl. 106—58)

ABSTRACT OF THE DISCLOSURE

A magnesia fusion critically including less than 0.06% $B_2O_3$ and less than 5% of constituents other than magnesia and brick made from grain of such a fusion, particularly such brick with tar-impregnation.

---

This invention is an improvement, in part, over applications Ser. Nos. 440,933, 349,736, and 383,207, assigned to the same assignee wherein it is taught that by controlling the boron content of high-purity magnesite brick the hot strength can be increased. These three applications were combined into a single application No. 483,356, which is now U.S. Patent No. 3,275,461. After combining them into a single case they were abandoned. This application also is an improvement, in some respects, over applications Ser. Nos. 372,050, now U.S. Patent No. 3,262,794, and 377,477, now U.S. Patent No. 3,262,795, also assigned to the same assignee wherein it is taught that fused grain magnesite and magnesite-lime brick having controlled chemical analyses have excellent hot strength and improved resistance to BOF slag. This present application is considered pertinent to the latter two patents and applications because it deals with a fused magnesia grain of controlled chemistry. It is considered pertinent to the other applications and the patent which resulted from their combined disclosure, because it deals with the control of boron content primarily.

The new oxygen steelmaking processes have been variously referred to as the LD process, Kaldo process, rotor process, oxygen converter process, or simply as oxygen blowing. In this process, molten iron to be refined into steel is contained in a vessel or converter. A stream of oxygen is directed against the bath of molten iron, thereby oxidizing the various impurities and enabling their removal to a slag which covers the surface of the molten bath. The slag is of a basic nature. During the blow, the bath and slag churn with a violent motion causing washing of the vessel or converter lining which is comprised of refractory brick. The bath reaches temperatures around 2900° F., and the atmosphere directly above it reaches much higher temperatures. Obviously, the refractory lining must be resistant to the chemical action of basic slags and to the general washing action of the turbulent bath and slag. Also, the lining must have sufficient strength at elevated temperatures to support itself. These then are the general requirements of a refractories lining for an oxygen converter.

In the past, tar-bonded dolomite and tar-bonded magnesite refractories have been extensively used as oxygen converter linings. In the larger vessels and in the severe wear areas of others, burned, tar-impregnated, magnesite brick have been used.

The term "magnesite," as used in this specification and in the refractories art, means a composition primarily MgO. (The chemical composition of crude magnesite is $MgCO_3$.) "Dead burned magnesite" is magnesite or other MgO-yielding materials treated at elevated temperatures, for example over 3000° F., whereby they sinter and coalesce into a dense, nonreactive grain. "Dead burned dolomite" is simply dolomite which has received a similar treatment.

Tar-bonded brick are those in which a size-graded aggregate is held together by a tar bond. The brick are often baked or tempered to cokify some or all of the tar. In any event, the tar cokes in service to form carbon which is very refractory and nonwettable by steelmaking slags. A burned brick is one in which a size-graded aggregate is ceramically bonded by burning at temperatures where sintering can occur. Burned brick are often tar-impregnated, i.e., their pores are filled with tar or pitch to retard the penetration of slags.

Some refractories brick are manufactured by "fusion casting," a process where the batch is heated until molten and then cast similarly to foundry molding and, thereafter, very carefully cooled. This type of brick has several outstanding properties, but it is very expensive because of the high-temperature required for melting and because of the expensive molds, the need for grinding the surfaces, and because of the delicate cooling and annealing treatment which it must be given. Many of the advantages of fused cast brick are incorporated in the much less expensive and, in some ways, superior "fused grain brick." These brick are made by first fusing the raw materials, crushing them to form a size-graded batch, forming the batch into brick by conventional techniques, and then firing. This invention pertains primarily to burned fused grain magnesite brick. For use in the oxygen vessels, these brick are normally impregnated with tar.

It is an object of this invention to provide burned, tar-impregnated brick for lining basic oxygen steelmaking vessels, which brick have extremely high strengths at elevated temperatures and which have unusually good slag resistance. It is a further object of this invention to provide a burned fused grain magnesite brick with a controlled low boron content. It is still another object of this invention to provide a method of making burned fused grain magnesite brick with low boron content.

Briefly, according to one aspect of the invention, there is provided burned refractory shapes made from a batch consisting of fused magnesite grain, analyzing (by weight and on an oxide basis) a maximum of 0.06% $B_2O_3$, a maximum of about 5% other impurities including CaO, $SiO_2$, $Al_2O_3$, and $Cr_2O_3$, and the balance MgO.

In a preferred embodiment, the $B_2O_3$ content does not exceed 0.05% and, optimally, it does not exceed 0.02%.

Applicant has discovered that by carefully controlling the boron content ($B_2O_3$) of fused grain magnesite brick, a brick is provided that has unexpectedly high hot strength and unusually good slag resistance. Combining the techniques of (1) fusing the raw magnesite batch, and (2) reducing the $B_2O_3$ content below a critical level provides a synergistic effect.

In practice, brick of the present invention are produced by fusing (for example, in an electric arc furnace) magnesite from some source, cooling, crushing the fusion to form a size-graded brickmaking batch, shaping the batch into brick (for example, by pressing), and burning.

Refractory magnesites are available from two primary sources. One is natural magnesite, which implies the product was obtained by burning a naturally-occurring mineral. The other source is synthetic magnesite, which implies the product was extracted from sea water or brines. Magnesites made from sea water usually having a $B_2O_3$ content between 0.15 and 0.23%. Those made from brines usually have a $B_2O_3$ content around 0.10%.

In all commercial plants which make synthetic magnesites by calcining magnesium hydroxide, of which I am aware, operations basically are similar. Magnesium hydroxide is obtained by reacting the magnesium salt with calcium hydroxide. Any solution of brine with sufficient magnesium concentration, which can be treated to remove sulfates and carbonates, can be used. The calcium hydroxide can come from any high-purity source, but is normally derived from calcined limestone or dolomite. The main considerations in selecting reactants are purity and economics relating to the proximity of suitable raw materials and markets.

The resulting magnesium hydroxide precipitate is washed with fresh water and thickened to remove calcium chloride and other minor allied compounds to concentrate a pure magnesium hydroxide slurry. The thickened magnesium hydroxide slurry is filtered, and the filter cake is fed to kilns; both rotary and shaft-type kilns are used for conversion to dead burned magnesite. Also, the filtrate may be electrically fused. In some processes the filter cake is first caustic calcined; that is, just sufficiently calcined to drive off chemical water and to render the magnesia surfaces very reactive. Thereafter, it is briquetted and dead burned or fused. Special additives may be made to the filter cake or to the caustic calcined magnesite prior to feeding into the kilns or electric furnaces.

In one embodiment of the invention, burned fused grain shapes are produced from caustic magnesia having a relatively high $B_2O_3$ content (i.e., 0.10 to 0.15%) by mixing the caustic magnesia with a sodium-yielding compound. By sodium-yielding compound, I mean a compound that will release sodium oxide at elevated temperatures. Examples of suitable sodium compounds are sodium carbonate, sodium sulfate, and organic sodium salts.

The purpose of the sodium in the mix is to combine with all the available $B_2O_3$ at elevated temperatures to form volatile sodium borates which escape from the magnesite as a vapor. About 1.0%, by weight, of sodium or sufficient sodium compound to provide 1% thereof is considered adequate.

The mixture is compressed into relatively small pellets or briquettes at pressures ranging from about 15,000 to 25,000 p.s.i. The pressed pellets are dead burned in a suitable vessel (such as a rotary or shaft kiln) and then are electrically-fused. The pellets are then size-graded to form a brickmaking batch which is formed into brick and burned according to a predetermined firing schedule.

Brick shapes produced according to this invention have exceptionally high hot strength, for instance a modulus of rupture at 2300° F. in excess of 1200 p.s.i. Their batches were sized so that about 30%, by weight, was —4+10 mesh, about 35% —10+28 mesh and the remainder ball milled fines. The size-graded batches were tempered with about 5% of a binder such as lignin liquor for 8 to 10 minutes in a mixer of the wet pan type. The batches were then shaped into brick by pressing at about 8,000 to 10,000 p.s.i. After pressing, the brick were dried at about 250° F. for five hours. After drying, the brick were given a cone 30 burn, which is about 2900° F., with a 10-hour hold at the top temperatures.

The following examples illustrate more clearly the teachings of the invention.

Examples A and B were made by forming a size-graded refractory batch of dead-burned high-purity magnesite grain (Example A had normal boron content). The dead-burned magnesite grain of Example B was especially prepared to have a low boron content. Example C was made similarly to the first two examples, except that the starting grain was first fused. This grain had a chemical analysis similar to Example A; that is, a normal boron content. Example D was prepared from a grain that had also been fused.

The fused grain of Example D was prepared by adding 1% sodium carbonate to caustic calcined magnesia prepared by precipitation of a magnesium hydroxide brine. The soda-containing caustic magnesite was briquetted and dead burned above about 3000° F. Thereafter, the dead burned grain was electrically fused. The boron content was reduced from 0.11%, by weight based on an oxide analysis, to 0.02% by this process.

TABLE I

| | Example No. | | | |
|---|---|---|---|---|
| | A | B | C | D |
| | Batch | | | |
| | Dead Burned Grain, Normal Boron | Dead Burned Grain, Low Boron | Fused Grain, Normal Boron | Fused Grain, Low Boron |
| Chemical Analysis of Batch, Percent: | | | | |
| Silica ($SiO_2$) | 0.9 | 0.7 | 0.6 | 0.67 |
| Alumina ($Al_2O_3$) | 0.3 | 0.3 | 0.5 | 0.35 |
| Iron Oxide ($Fe_2O_3$) | 0.3 | 0.3 | 0.3 | 0.20 |
| Lime (CaO) | 1.1 | 1.0 | 0.8 | 0.91 |
| Magnesia (MgO) | 97.3 | 97.7 | 97.8 | 97.8 |
| Boron ($B_2O_3$) | 0.11 | 0.02 | 0.08 | 0.02 |
| Bulk Density, p.c.f. (Av. 9) | 178 | 172 | 189 | 186 |
| Modulus of Rupture, p.s.i. (Av. 3): | | | | |
| At Room Temperature | 2,520 | 2,480 | 2,620 | 3,200 |
| At 2,300° F | 170 | 1,070 | 270 | 1,800 |
| At 2,600° F | 50 | 890 | (¹) | 960 |

¹ Not tested.

Table I, containing the hot strength properties of the fired brick of Examples A, B, C, and D, establishes that a synergistic effect occurs when combining the techniques of reducing the boron content and fusing the raw materials of a high-purity magnesite brick. Example A is a normal high-purity magnesite brick which is relatively weak at elevated temperatures. By reducing the boron content, as in Example B, the high-temperature strengths are increased. By fusing the raw materials, as in Example C, the high-temperature strength is slightly increased. By combining the two techniques, as in Example D, outstanding strengths are obtained.

Table II contains two of the examples contained in Table I (C and D) and three additional examples which were prepared in a similar manner. The fused grains used in Examples E, F, and G were prepared by adding 1% sodium carbonate to the caustic calcined magnesia, briquetting, and thereafter fusing in an electric furnace.

TABLE II

| Example No | C | D | E | F | G |
|---|---|---|---|---|---|
| Batch | All Fused Grain Brick | | | | |
| Chemical Analysis of Batch, Percent: | | | | | |
| Silica ($SiO_2$) | 0.6 | 0.67 | 0.6 | 0.7 | 0.5 |
| Alumina ($Al_2O_3$) | 0.5 | 0.35 | 0.4 | 0.5 | 0.4 |
| Iron Oxide ($Fe_2O_3$) | 0.3 | 0.20 | 0.2 | 0.3 | 0.3 |
| Lime (CaO) | 0.8 | 0.91 | 1.4 | 1.4 | 2.3 |
| Magnesia (MgO) | 97.8 | 97.85 | 96.9 | 97.8 | 96.44 |
| Boron ($B_2O_3$) | 0.08 | 0.02 | 0.05 | 0.06 | 0.06 |
| Bulk Density, p.c.f. (Av. 9) | 189 | 186 | 188 | 183 | 186 |
| Modulus of Rupture, p.s.i. (Av. 3): | | | | | |
| At Room Temperature | 2,620 | 3,200 | 2,350 | 1,980 | 2,020 |
| At 2,300° F | 270 | 1,800 | 1,760 | 1,230 | 1,320 |
| At 2,600° F | (¹) | 760 | 1,030 | 800 | 350 |

¹ Not tested.

Table II establishes that there is a critical range of boron contents for the practice of this invention. While brick with excellent properties were obtained by limiting the boron to 0.06%, brick containing 0.08% were unsatisfactory. Table II establishes that it is preferable to limit the boron to up to 0.05% and optimal to limit the boron to up to 0.02%. It is advantageous to limit the boron content to up to 0.06%.

Brick used in oxygen converters are usually tar-impregnated. This may be accomplished by heating tar or pitch to a temperature of about 400° F. and then immersing the brick to be impregnated in the fluid pitch or tar for about one-half hour. Generally, a coal-base pitch having a softening point on the order of 150° F. is used. However, commercially available tar or pitch, petroleum or coke-base can be used for this purpose.

From the foregoing discussion and description, it is evident that my invention provides a brick with superior tensile strength at high temperatures, a property most desirable in brick to be used in those zones of the oxygen converter or other vessels where abrasion resistance, strength, and resistance to spalling is required.

Having thus described my invention in detail and with sufficient particularity as to enable those skilled in the art to practice it, what is desired to have protected by Letters Patent is set forth in the following claims.

I claim:

1. Burned refractory shapes made from a batch consisting essentially of fused magnesite grain containing up to 0.06% $B_2O_3$, by weight on an oxide analysis, and less than about 5% other impurities including $CaO$, $SiO_2$, $Al_2O_3$, $Fe_2O_3$, and $Cr_2O_3$, the remainder being $MgO$, said shapes having a modulus of rupture at 2300° F. in excess of 1200 p.s.i.

2. The burned refractories shapes of claim 1 wherein the fused magnesite contains up to 0.05% $B_2O_3$.

3. The burned refractories shapes of claim 1 wherein the fused magnesite contains up to 0.02% $B_2O_3$.

4. The burned refractories shapes of claim 1 which have been tar-impregnated.

References Cited

UNITED STATES PATENTS

| | | | |
|---|---|---|---|
| 2,823,134 | 2/1958 | Atlas | 23—201 |
| 2,957,752 | 10/1960 | Gloss | 23—201 |
| 3,030,228 | 4/1962 | Hernandez et al. | 106—58 |
| 3,262,794 | 7/1966 | Davies et al. | 106—58 |

TOBIAS E. LEVOW, *Primary Examiner.*

JAMES E. POER, HELEN M. McCARTHY, *Examiners.*